US007882562B2

(12) United States Patent
Arroyo et al.

(10) Patent No.: US 7,882,562 B2
(45) Date of Patent: Feb. 1, 2011

(54) APPARATUS, SYSTEM, AND METHOD FOR DEPLOYING ISCSI PARAMETERS TO A DISKLESS COMPUTING DEVICE

(75) Inventors: Jesse Paul Arroyo, Rochester, MN (US); Joseph Edward Bolan, Morrissville, NC (US); Thomas M. Brey, Cary, NC (US); Josep Cors, Rochester, MN (US); Gregory William Dake, Durham, NC (US); Scott Neil Dunham, Raleigh, NC (US); William Gavin Holland, Cary, NC (US); Theodore Brian Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 11/300,961

(22) Filed: Dec. 15, 2005

(65) Prior Publication Data
US 2007/0143611 A1  Jun. 21, 2007

(51) Int. Cl.
H04L 29/00 (2006.01)
(52) U.S. Cl. ............................. 726/26; 726/3
(58) Field of Classification Search ....................... None
See application file for complete search history.

(56) References Cited

U.S. PATENT DOCUMENTS

| 5,349,643 | A  | 9/1994 | Cox et al. ..................... 380/25 |
| 5,884,024 | A  | 3/1999 | Lim et al. |
| 6,212,563 | B1 | 4/2001 | Beser |
| 6,697,868 | B2 | 2/2004 | Craft et al. |
| 6,728,875 | B1 | 4/2004 | Aguilar et al. |
| 6,857,069 | B1 | 2/2005 | Rissmeyer et al. ............. 713/2 |
| 7,127,602 | B1 * | 10/2006 | Bakke et al. ................... 713/2 |
| 7,337,219 | B1 | 2/2008 | Meenan et al. |

(Continued)

FOREIGN PATENT DOCUMENTS

JP   2005244988   9/2005

(Continued)

OTHER PUBLICATIONS

Droms, "RFC 2131—Dynamic Host Configuration Protocol", Mar. 1997.*

(Continued)

Primary Examiner—Minh Dinh
(74) Attorney, Agent, or Firm—Kunzler Needham Massey & Thorpe

(57) ABSTRACT

An apparatus, system, and method are disclosed for deploying sensitive communication parameters to a diskless computing device. A parameter structure module is included to store one or more Internet Small Computer System Interface ("iSCSI") communication parameters in an extendable data structure configured to store a set of basic parameter settings and a set of extended parameter settings. A link module is included to establish a secure link to a diskless computing device over a physically secure connection. A deployment module is included to deploy the extendable data structure over the secure connection to a non-volatile memory in the diskless computing device. The non-volatile memory is configured to provide sensitive iSCSI communication parameters provided by the extendable data structure to a CPU of the diskless computing device during a boot sequence.

35 Claims, 7 Drawing Sheets

U.S. PATENT DOCUMENTS

| | | | |
|---|---|---|---|
| 7,363,356 B1 * | 4/2008 | Rissmeyer et al. | 709/220 |
| 7,403,987 B1 | 7/2008 | Marinelli et al. | |
| 2002/0120706 A1 | 8/2002 | Murphy | 709/208 |
| 2002/0161848 A1 | 10/2002 | Willman et al. | |
| 2002/0199205 A1 | 12/2002 | Sonawane et al. | |
| 2003/0005276 A1 | 1/2003 | French et al. | |
| 2003/0084209 A1 | 5/2003 | Chadalapaka | |
| 2003/0093541 A1 | 5/2003 | Lolayekar et al. | |
| 2003/0131182 A1 | 7/2003 | Kumar et al. | |
| 2003/0140210 A1 | 7/2003 | Testardi | |
| 2003/0191932 A1 | 10/2003 | Allen et al. | 713/150 |
| 2004/0025052 A1 | 2/2004 | Dickenson | |
| 2004/0078521 A1 | 4/2004 | Hawks et al. | |
| 2004/0117438 A1 | 6/2004 | Considine et al. | |
| 2004/0162880 A1 | 8/2004 | Arnone et al. | |
| 2004/0177133 A1 | 9/2004 | Harrison et al. | |
| 2004/0193683 A1 | 9/2004 | Blumofe | |
| 2005/0013441 A1 | 1/2005 | Klein | 380/278 |
| 2005/0015459 A1 | 1/2005 | Gole et al. | |
| 2005/0015460 A1 | 1/2005 | Gole et al. | |
| 2005/0044162 A1 | 2/2005 | Liang et al. | |
| 2005/0138346 A1 | 6/2005 | Cauthron | |
| 2005/0216421 A1 | 9/2005 | Barry et al. | |
| 2005/0216668 A1 * | 9/2005 | Kobayashi et al. | 711/118 |
| 2005/0249196 A1 | 11/2005 | Ansari et al. | |
| 2006/0015513 A1 | 1/2006 | Poyhonen et al. | |
| 2006/0085522 A1 | 4/2006 | Spry | |
| 2006/0218252 A1 | 9/2006 | Ford | |
| 2007/0180509 A1 | 8/2007 | Swartz et al. | |

FOREIGN PATENT DOCUMENTS

| | | |
|---|---|---|
| WO | 0161904 A1 | 8/2001 |
| WO | 2004/038699 | 5/2004 |

OTHER PUBLICATIONS

Alexander, "RFC 2132—DHCP Options and BOOTP Extensions", Mar. 1997.*

Droms et al., "RFC 3118—Authentication for DHCP Messages", Jun. 2001.*

'iSCSI Security SRP,' "Real Storage" website, p. 1.

'iSCSI,' iSCSI=a Whatis.com definition p. 1-3.

Prasenjit Sarker and Duancan Missimer, 'Bootstrapping Clients Using the ISCSI Protocol,' IP Storage Working Group Memo, p. 1-12, Mar. 18, 2004.

David Black, 'iSCSI Boot-DHCP Root Path Option,' http://www.pdl.cmu.edu/mailinglists/ips/mail/msg11847.html.

Britt Bolen, 'iSCSI-Root mini-HOWTO' http://eludicate.com/~bolen/iscsi/V2.0.1, Jan. 22, 2004.

Prasenjit Sarker, 'Status of iSCSI Boot,' http://www.ietf.org/proceddings/01dec/slides/ips-12/sld001.htm, slide 1-20.

'Industry's first native iSCSI tape libraries,' Spectra Logic, Library Feature, 4.1.iscsi.042003.

Bernard Adoba, 'I-D ACTION: draft-ieft-ips-iscsi-boot-09.txt,' http://www.pdl.cmu.edu/mailinglists/ips/mail/msg12412.html , p. 1-4.

Office Action for U.S. Appl. No. 11/304,852 dated Dec. 23, 2009.

Ed Park, "Dual-Boot Linux and Windows 2000/Windows XP with GRUB HOWTO", http://web.archive.org/web/20030412194011/http://www.geocities.com/epark/linux/grub-w2k-HOWTO.html, Mar. 29, 2003.

Office Action for U.S. Appl. No. 11/300,999 dated Dec. 26, 2008.

Office Action for U.S. Appl. No. 11/300,999 dated Jun. 16, 2009.

Office Action for U.S. Appl. No. 11/300,999 dated Jan. 7, 2010.

"User Selectable Boot Process", IBM Technical Disclosure Bulletin vol. 38, No. 1, Jan. 1995, pp. 377-378.

"Unconditional Installation of SCSI Device Drivers", IBM Technical Disclosure Bulletin, vol. 37, No. 4a, Apr. 1994, pp. 153-154.

Office Action for U.S. Appl. No. 11/300,999 dated May 13, 2010.

Office Action for U.S. Appl. No. 11/304,852 dated Jul. 22, 2010.

"Remote Supervisor Adapter II SlimLine and Remote Supervisor Adapter II: User's Guide", IBM, Fourth Edition, Sep. 2004 in Japanese and English.

* cited by examiner

APPARATUS, SYSTEM, AND METHOD FOR DEPLOYING ISCSI PARAMETERS TO A DISKLESS COMPUTING DEVICE

BACKGROUND OF THE INVENTION

1. Field of the Invention

This invention relates to deploying iSCSI parameters and more particularly relates to an architecture for securely and remotely deploying iSCSI parameters in a diskless boot environment.

2. Description of the Related Art

Storage area networks or SANs are an important part of maintaining data. Traditionally, storage area networks are comprised of one or more servers connected in a private fiber channel network with one or more data storage devices. Fiber channel networks have physical limitations and other security measures that have ensured data security. Typically, distance limitations have ensured that the servers in communication with the storage devices are close enough that outsiders have not had access to the storage devices.

In typical client computers, a communication protocol called Small Computer System Interface ("SCSI") is used to communicate with devices such as disk drives. Recently, a new protocol called Internet SCSI ("iSCSI") is used to allow access to storage area network devices and other computing devices over long distances through local area networks, wide area networks, the Internet, or other similar networks. These networks are often public and typically use the de facto Transmission Control Protocol/Internet Protocol ("TCP/IP") protocol. Because iSCSI operates on top of TCP/IP and most network traffic on TCP/IP networks can be intercepted by unauthorized users, security is a concern.

Secure communications over an iSCSI network has been addressed using various security measures such as Challenge Handshake Authentication Protocol ("CHAP"), Secure Remote Password ("SRP"), Internet Protocol Security ("IPSec"), digital certificates, and the like. Each security measure has inherent advantages and disadvantages. Most security measures depend on various combinations of authentication and encryption. Encryption relies on encryption keys known to a source and a target which are used to unlock the encryption and allow decryption. Authentication also relies on verification of secure parameters such as a user name and a password at the source and target. Sending sensitive parameters such as encryption keys to clients and servers is a security problem because any sensitive parameters sent over a public network may be intercepted by unauthorized users with access to the public network. A private network inside a building may be more secure than a public network but even for users of a private network there may be private or sensitive material that an employer may wish to protect from employees.

One solution used for computers with a disk or other data storage local to the computer is to deploy the keys and parameters using data storage media. Typically such computers contain a hard disk or other data storage within the chassis of the computer. For example, when iSCSI software is deployed using a CD or other media, the sensitive parameters such as encryption keys may be stored with the software on a data storage device. However, this method requires distribution of physical media, requires a person to install the media on each machine, and requires a means to read the media.

In storage area network systems, recently blade centers and other servers are used that do not have local data storage devices. Data storage devices may be separated from the computers or servers and connected using the storage area network. In storage area networks using iSCSI or a combination of iSCSI and Fiber Channel, the data storage devices may be accessible using iSCSI. This type of arrangement typically requires security measures to prevent unwanted access of the data storage devices, servers, and other devices. However, deploying sensitive parameters to the diskless servers is a problem because transmitting the sensitive parameters over the iSCSI network presents security risks. Since the diskless computers typically have no internal disk or other means to read local removable storage media, the sensitive parameters cannot be loaded via some removable storage media.

One method to load sensitive parameters on a diskless computing device is to physically connect to an input/output ("I/O") interface of the diskless computing device and then to manually load sensitive parameters to each diskless computing device. The parameters may then be stored with other vital product data in non-volatile memory. Manual loading of sensitive parameter is secure, but is time consuming and requires a person to physically visit each diskless computing device and make a connection to the device. Deploying parameters over a public network, for example by deploying parameters to a Dynamic Host Configuration Protocol ("DHCP") server which then transmits the parameters to an iSCSI initiator during initialization, allows automation of parameter deployment, but is not secure.

From the foregoing discussion, it should be apparent that a need exists for an apparatus, system, and method to deploy sensitive communication parameters to a diskless computing device. Beneficially, such an apparatus, system, and method would deploy sensitive communication parameters in an extendable data structure to diskless computing devices and servers over a secure connection without passing such sensitive parameters over a public network.

SUMMARY OF THE INVENTION

The present invention has been developed in response to the present state of the art, and in particular, in response to the problems and needs in the art that have not yet been fully solved by currently available methods to securely deploy iSCSI communication parameters to a diskless communication device. Accordingly, the present invention has been developed to provide an apparatus, system, and method for securely deploying iSCSI communication parameters to a diskless computing device that overcome many or all of the above-discussed shortcomings in the art.

The apparatus to deploy iSCSI communication parameters to a diskless communication device is provided with a logic unit containing a plurality of modules configured to functionally execute the necessary steps of storing iSCSI communication parameters in an extendable data structure and deploying the data structure over a secure link to a diskless computing device. These modules in the described embodiments include a parameter structure module that stores one or more iSCSI communication parameters in an extendable data structure configured to store a set of basic parameter settings and a set of extended parameter settings. A link module is included to establish a secure link to a diskless computing device over a physically secure connection. A deployment module is included to deploy the extendable data structure over the secure connection to a non-volatile memory in the diskless computing device. The non-volatile memory is configured to provide the sensitive iSCSI communication parameters from by the extendable data structure to a CPU of the diskless computing device during a boot sequence.

The apparatus, in one embodiment, the deployment module deploys the extendable data structure independent of operation of an operating system of the diskless computing device. In another embodiment, the apparatus also includes a public path module that transmits an extendable data structure with one or more non-sensitive iSCSI communication parameters through a non-secure connection to the diskless computing device. In a further embodiment, the public path module includes a DHCP module that transmits the extendable data structure having non-sensitive iSCSI communication parameters to a Dynamic Host Configuration Protocol ("DHCP") server configured to send the extendable data structure to the diskless computing device. In yet another embodiment, the public path module transmits the extendable data structure having non-sensitive iSCSI communication parameters to the diskless computing device during an initialization sequence.

In one embodiment, the secure connection includes a monitor module configured to communicate environmental factors with a plurality of diskless computing devices as well as iSCSI communication parameters. In another embodiment, the secure connection includes a Remote Supervisor Adaptor ("RSA II") configured to communicate environmental data with a plurality of diskless computing devices as well as iSCSI communication parameters.

In a further embodiment, the apparatus includes a memory allocation module that deploys an extended version of the extendable data structure having a parameter setting to reallocate the non-volatile memory. In another embodiment, the memory allocation module also transmits a digital certificate configured for storage within the reallocated non-volatile memory.

In another embodiment, an apparatus is included to deploy sensitive communication parameters to a diskless computing device. The apparatus includes a secure link module that establishes a secure link between a diskless computing device and a computer over a physically secure connection. A receive module is included to receive one or more sensitive iSCSI communication parameters in an extendable data structure comprising a set of basic parameter settings and a set of extended parameter settings. The apparatus includes a storage module that stores the one or more sensitive iSCSI communication parameters in a non-volatile memory in the diskless computing device. The non-volatile memory is configured to provide the one or more sensitive iSCSI communication parameters provided by the extendable data structure to a CPU in the diskless computing device during a boot sequence.

In one embodiment, the apparatus is further configured to include an iSCSI communication module that receives the sensitive iSCSI communication parameters from the CPU to establish a secure iSCSI communication session between the diskless computing device and an iSCSI target. In a further embodiment, the iSCSI communication module receives non-sensitive iSCSI communications parameters transmitted from a DHCP server. In another embodiment, the iSCSI target device is a data storage device having an operating system for the diskless computing device. In one embodiment, the apparatus includes a bios module that retrieves the one or more iSCSI communication parameters from the non-volatile memory during a boot sequence.

A system of the present invention is also presented to deploy sensitive communication parameters. The system may be embodied by a computer, a diskless computing device, an iSCSI target, and a storage area network connecting the diskless computing device and the iSCSI target device, where the storage area network at least partially communicates using iSCSI. In particular, the system includes a parameter structure module that stores one or more iSCSI communication parameters in an extendable data structure configured to store a set of basic parameter settings and a set of extended parameter settings. The system includes a link module that establishes a secure link between the computer and the diskless computing device over a physically secure connection. The system includes a deployment module that deploys the extendable data structure from the computer to the diskless computing device over the secure connection. The system also includes a storage module that stores the one or more sensitive iSCSI communication parameters of the extendable data structure in a non-volatile memory in the diskless computing device. The non-volatile memory is configured to provide the sensitive iSCSI communication parameters provided by the extendable data structure to a CPU in the diskless computing device during a boot sequence.

The system may further include an iSCSI communication module that receives the sensitive iSCSI communication parameters to establish a secure iSCSI communication session between the diskless computing device and an iSCSI target device. In one embodiment, the iSCSI communication module receives non-sensitive iSCSI communications parameters transmitted from a DHCP server.

In one embodiment, the system includes a public path module that transmits an extendable data structure with one or more iSCSI communication parameters through a non-secure connection to the diskless computing device. In another embodiment, the system includes a Baseboard Management Controller ("BMC") in the diskless computing device that receives the extendable data structure and stores the one or more sensitive iSCSI communication parameters of the extendable data structure in the non-volatile memory. In another embodiment, the communication parameters of the extendable data structure comprise parameters compatible with secure communication using one of a CHAP, a SRP protocol, and an IPSec protocol.

In one embodiment, the diskless computing device is a blade server in a blade center. In another embodiment, the iSCSI target is a general purpose data storage device.

A method of the present invention is also presented for deploying sensitive communication parameters to a diskless computing device. The method in the disclosed embodiments substantially includes the steps necessary to carry out the functions presented above with respect to the operation of the described apparatus and system. In one embodiment, the method includes storing one or more iSCSI communication parameters in a data structure. The method also includes establishing a secure link to a diskless computing device over a physically secure connection and deploying the data structure over the secure connection to a non-volatile memory in the diskless computing device. The non-volatile memory is configured to provide sensitive iSCSI communication parameters provided by the data structure to a CPU of the diskless computing device during a boot sequence.

In one embodiment, the method includes transmitting a data structure with one or more non-sensitive iSCSI communication parameters through a non-secure connection to the diskless computing device. In a further embodiment, the method includes transmitting the data structure having non-sensitive iSCSI communication parameters to a DHCP server configured to send the data structure to one or more diskless computing devices. In another embodiment, the method includes transmitting the data structure having non-sensitive iSCSI communication parameters to the diskless computing device during an initialization sequence.

In one embodiment, the iSCSI communication parameters of the data structure comprise parameters compatible with secure communication using one of a Challenge Handshake Authentication Protocol ("CHAP"), a Secure Remote Password ("SRP") protocol, and an Internet Protocol Security ("IPSec") protocol. In another embodiment, the method includes deploying an extended version of the data structure having a parameter setting to reallocate the non-volatile memory to store a digital certificate. In yet another embodiment, the method includes establishing the secure connection through authentication and verification of security credentials.

A method of the present invention is also presented for configuring an iSCSI network of a diskless computing device. The method in the disclosed embodiments substantially includes the steps necessary to carry out the functions presented above with respect to the operation of the described apparatus and system. In one embodiment, the method includes determining an iSCSI parameter security profile of a customer having a plurality of diskless computing devices, defining an extendable data structure configured to store a set of basic parameter settings and a set of extended parameter settings that satisfies the iSCSI parameter security profile, and executing configuration software. The configuration software stores one or more iSCSI communication parameters in the extendable data structure. The configuration software establishes a link to each diskless computing device being configured in a network over a physically secure connection. The configuration software also deploys the extendable data structure over the secure connection to a non-volatile memory in each diskless computing device being configured. The non-volatile memory is configured to provide sensitive iSCSI communication parameters provided by the extendable data structure to a CPU of the diskless computing device during a boot sequence. In another embodiment, the method includes testing the boot sequence for each diskless computing device to ensure conformity with the iSCSI parameter security profile.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, so additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
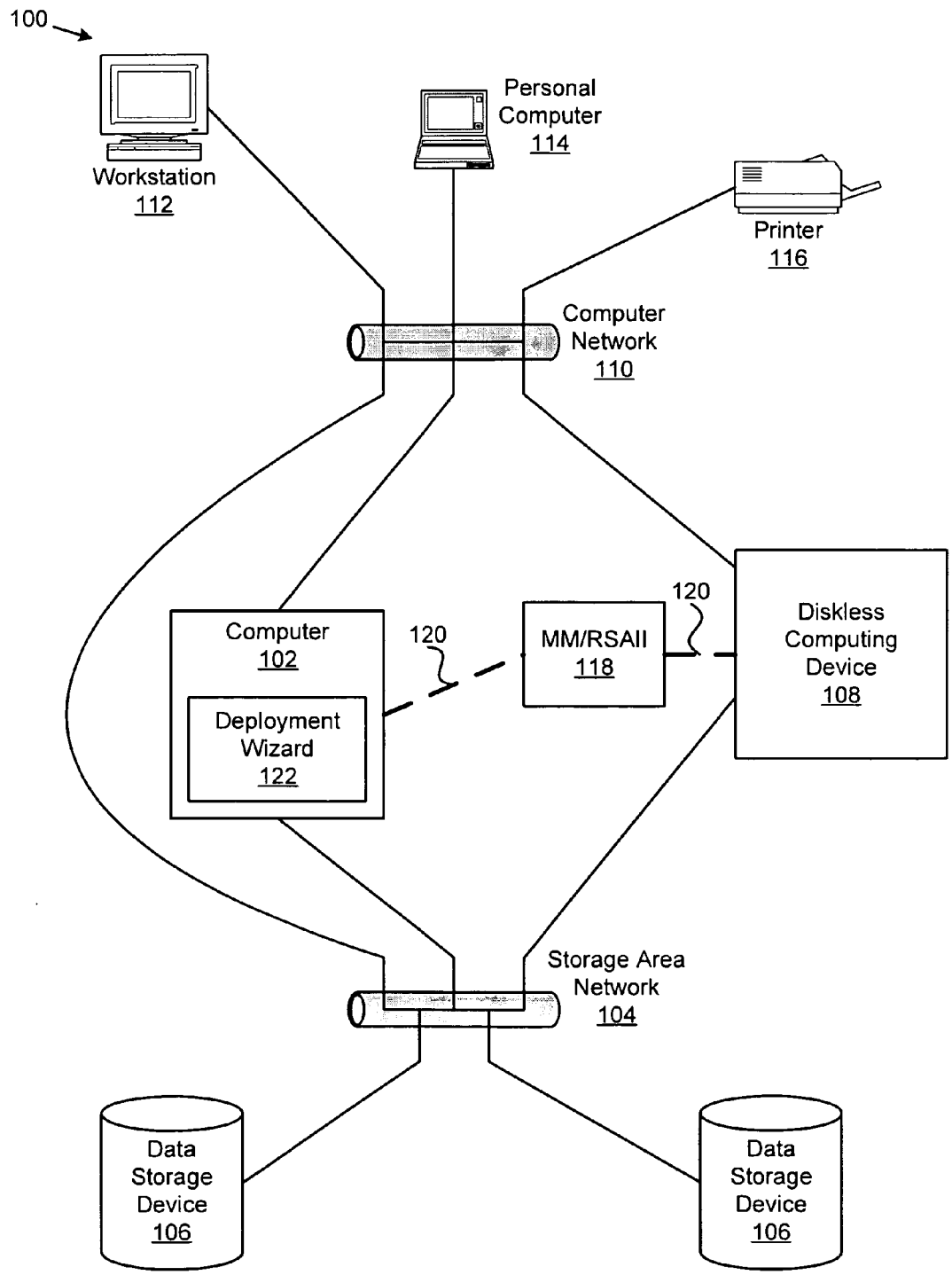
FIG. 1 is a schematic block diagram illustrating one embodiment of a system for deploying sensitive iSCSI communication parameters to a diskless computing device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a schematic block diagram illustrating one embodiment of a system 100 for deploying sensitive iSCSI communication parameters to a diskless computing device in accordance with the present invention. The system 100 includes a computer 102 connected to a storage area network ("SAN") 104. The computer 102 may be a server, personal computer, laptop computer, or the like. The computer 102 may include a disk or other internal data storage device containing an image of an operating system to allow the computer to boot independent of any data storage device 106 linked to the computer 102 through the storage area network 104. A data storage device 106 may be a hard disk, CD burner, tape drive, optical drive or any other data storage device. A data storage device 106 may contain an image of an operating system, data pertinent to startup and operation of a diskless computing device 108, data from a client, or any other data.

The system 100 also includes a diskless computing device 108 connected to the storage area network 104. The diskless computing device 108 by definition does not have a disk or other internal data storage device containing an image of an operating system and preferably communicates with a data storage device 106 containing an image of an operating system in order to boot. To establish a connection with a data storage device 106 prior to boot up, the diskless computing device 108 communicates over a SAN 104 or other connection.

In addition, the computer 102 and diskless computing device 108 typically are connected to a computer network 110 that may connect to other devices such as a workstation 112, a personal computer 114, or a printer 116. Typically, the computer network 110 includes TCP/IP communication and may allow unauthorized users to have access to sensitive data on the computer network 110. In one embodiment, the computer network 110 includes communication with the Internet, which may allow unauthorized users outside of the computer network 110 unauthorized to access to data on the computer network 110. In another embodiment, the computer network 110 has access to the SAN 104 and includes iSCSI communication.

If the communication protocol between the diskless computing device 108 and the data storage device 106 is iSCSI, the connection is not secure. The un-secure communication protocol requires some sort of security protocol such as CHAP, SRP, IPSec, digital certificates, or other suitable security protocol prevent unwanted intrusion or monitoring by a third party.

In some security protocols, security is initiated at the session level. In this type of security system, security credentials are exchanges such as user names and passwords. Once a source and target have exchanged credentials, communication between the target and source is assumed secure and data may be exchanged. In other security systems, encryption is used to exchange data. In an encryption protocol, typically private encryption keys are used at the source and target along with an encryption algorithm to encrypt packets of data sent between the source and target. Another security protocol involves digital certificates issued by a trusted third party. The third party ensures that the source and target are trusted and valid. Before secure communication can be initiated between a source and a target, the source and target need to have sensitive communication parameters such as proper credentials, encryption keys, digital certificates, device identification numbers ("IDs"), etc. and other parameters.

To ensure secure communication, the security parameters are typically transmitted to the source and target in a secure way. In an iSCSI environment, distribution of sensitive iSCSI communication parameters such as credentials, encryption keys, device IDs and the like using iSCSI or other un-secure protocol presents security risks. Conventional methods of distributing sensitive iSCSI parameters to a diskless computing device 108 using a manual connection or distribution through a DHCP server have undesirable security risks. The present embodiment is advantageous in that sensitive iSCSI communication parameters are deployed over a physically secure connection to a diskless computing device 108.

The diskless computing device 108 may be a blade in a blade center or may be a diskless server in a server farm. A diskless computing device 108 in the form of a blade typically communicates with a monitoring module ("MM") 118. The monitoring module 118 may communicate with a plurality of blades and typically monitors health of the blades. A typical monitoring module 118 is able to power-cycle blades, monitor environmental factors such as temperature, transmit alarms, and other related tasks. One of skill in the art will recognize other functions of a typical monitor module 118. A monitor module 118 may also be in communication with the computer 102. In one embodiment, the monitor module 118 and the computer 102 are the same device. In another embodiment, the monitor module 118 and the computer 102 are separate devices in communication with each other.

In one embodiment, the diskless computing device 108 is a server in a server farm and communicates with the computer 102 through a Remote Supervisor Adaptor ("RSA II") 118. The RSA II 118 may also monitor health of one or more servers and may monitor and communicate environmental factors of a server.

In the present embodiment, the connection between the computer 102 and the diskless computing device 108 comprises a physically secure connection 120. In one embodiment, the physically secure connection 120 comprises the monitor module 118. In another embodiment, the physically secure connection 120 comprises the RSA II 118. The physically secure connection 120 may be called an out-of-band connection in contrast with an in-band connection. Typically, an out-of-band connection comprises a back channel that typically transmits control commands, but may also transmit data. The out-of-band connection typically is independent of the operation of an operation system of a diskless computing device 108 connected to the out-of-band connection. An out-of-band connection typically derives power independent from the diskless computing devices 108 or other devices controlled on the out-of-band connection. An out-of-band connection may be used for debugging, diagnosis of a problem, restarting a computer, maintenance, monitoring and communicating environmental factors, etc.

An in-band connection, by contrast, comprises a connection to the Internet 110, a SAN 104, or other computer network 110. An in-band connection typically comprises Internet Protocol ("IP") traffic where other devices may have access to intercept communications other than an intended target. A typical in-band connection comprises a high bandwidth connection and is used to transmit data, however, control commands may also be sent over an in-band connection. One of skill in the art will recognize other physically secure connections 120 suitable for out-of-band communication between a computer 102 and a diskless computing device 108 independent of an operating system on a diskless computing device 108 and that does not expose transmitted data to an unauthorized user.

To establish a secure communication between the diskless computing device 108 and a data storage device 106, iSCSI communication parameters are deployed to the diskless computing device 108 prior to initiation of a communication session. Passing sensitive iSCSI communication parameters over a public or un-secure network (104, 110) exposes the iSCSI parameters to unwanted intrusion and detection. To avoid sending the sensitive iSCSI communication parameters over an un-secure network (104, 110) with a diskless computing device 108, the parameters are transmitted over the physically secure connection 120 to the diskless computing device 108. Preferably, the physically secure connection 120 is an out-of-band connection independent of an operating system of the diskless computing device 108, does not expose data to unauthorized users, and does not provide a security risk.

In the present embodiment, the computer 102 includes a deployment wizard 122 configured to deploy sensitive iSCSI parameters in an extendable data structure to the diskless computing device 108. By deploying an extendable data structure with sensitive iSCSI communication parameters over a physically secure, out-of-band connection 120 to the diskless computing device 108, the sensitive iSCSI communication parameters can be deployed in a structured, secure way that avoids time consuming manual deployment and in-band deployment that poses security risks. In addition, deploying such an extendable data structure with iSCSI communication parameters provides a standard structure for efficient iSCSI parameter deployment.

In one embodiment, the sensitive iSCSI parameters are deployed from the computer 102 with the deployment wizard 122 through the monitor module 118 over the physically secure connection 120. In another embodiment, the computer 102 and monitor module 118 are the same device and include the deployment wizard 122. In another embodiment, the computer 102 is a standalone computer in communication with the diskless computing device 108 through the monitor module 118 or RSA II 118. One of skill in the art will recognize other ways for a computer 102 with a deployment wizard 122 to communicate with the diskless computing device 108 over a physically secure connection 120.

Figure 2:
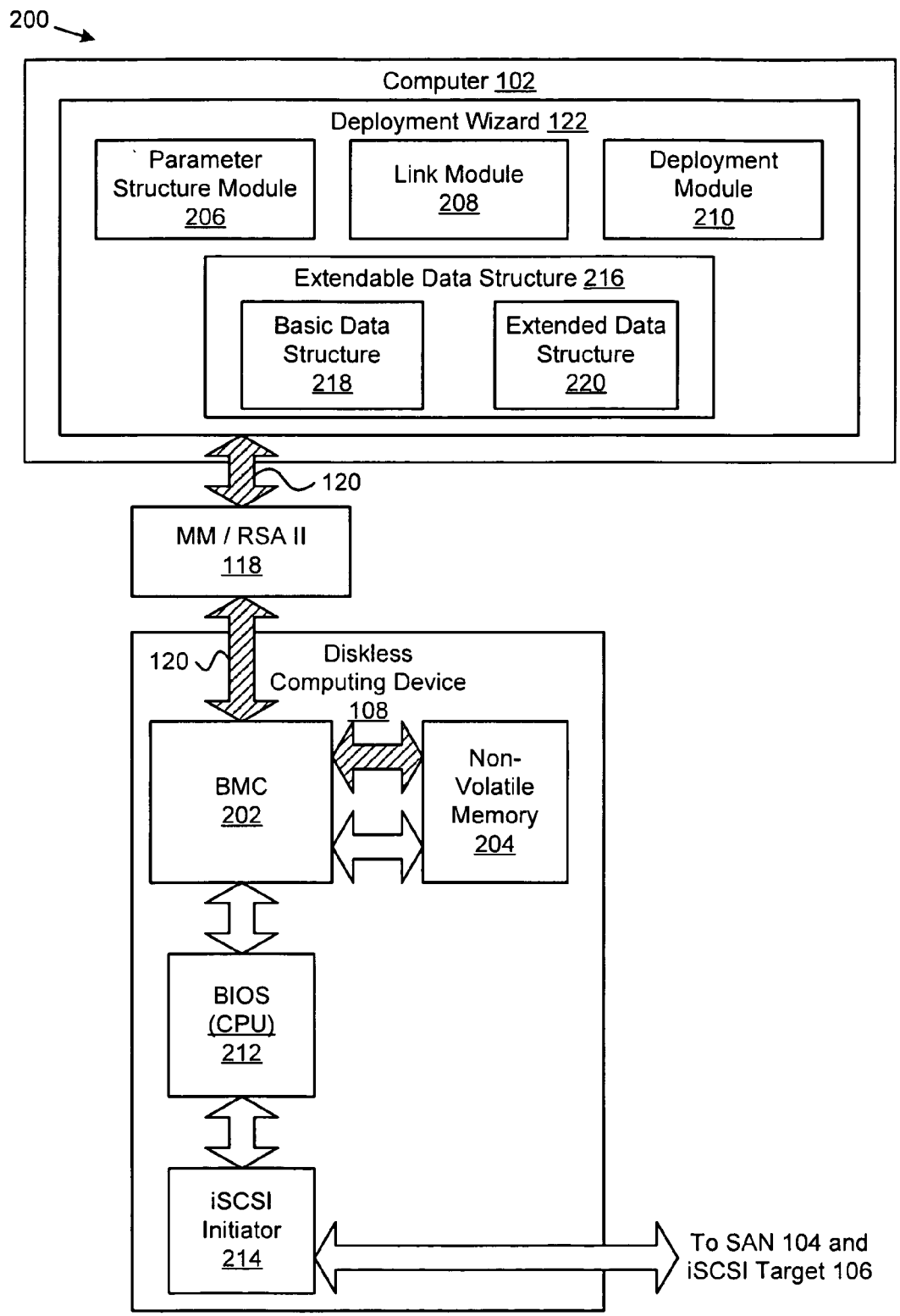
FIG. 2 is a schematic block diagram illustrating one embodiment of an apparatus for deploying sensitive iSCSI communication parameters to a diskless computing device in accordance with the present invention.

FIG. 2 is a schematic block diagram illustrating one embodiment of an apparatus 200 for deploying sensitive iSCSI communication parameters to a diskless computing device 108 in accordance with the present invention. The apparatus 200 includes a computer 102 with a deployment wizard 122 in communication with a diskless computing device 108 over a physically secure connection 120.

In one embodiment, the physically secure connection 120 may include a monitor module 118 or remote supervisor adaptor 118. In another embodiment, the diskless computing device 108 includes a BMC 202 controlling a non-volatile memory 204 containing vital product data ("VPD").

In one embodiment, the physically secure connection 120 comprises the BMC 202 and the BMC 202 communicates with the non-volatile memory 204. Information, such as sensitive iSCSI communication parameters may be transmitted from the computer 102 through the MM/RSA II 118 to the BMC 202, which stores the parameters in the non-volatile memory 204. In one embodiment, the physically secure connection 120 is established through authentication and verification of security credentials passed between the deployment wizard 122 and the BMC 202.

Typically, the BMC 202 is a controller that monitors the health and well-being of the diskless computing device 108. The BMC 202 may monitor temperature, device status, voltage, CPU 212 usage, etc. and may transmit alarms. In addition, the BMC 202 may receive parameters, device serial numbers, version numbers, and other vital product data, and store the VPD in the non-volatile memory 204. Typically the BMC 202 is powered independent from other components of the diskless computing device 108. In one embodiment, the BMC 202 is powered from a source providing power to the physically secure, out-of-band connection 120. Preferably, the BMC 202 receives iSCSI communication parameters and stores the parameters in the non-volatile memory 204.

The non-volatile memory 204 is typically small and accessible to the BMC 202. In one embodiment, the non-volatile memory 204 is under exclusive control of the BMC 202 and may receive power from the BMC 202 or out-of-band connection 120. In another embodiment, the non-volatile memory 202 may be accessed by the basic input/output system ("BIOS") of a CPU 212. Typically, the non-volatile memory 204 is used to store vital product data including iSCSI parameters.

In the present embodiment, the computer 102 includes a deployment wizard 122. The deployment wizard 122 includes a parameter structure module 206, a link module 208, and a deployment module 210. The parameter structure module 206 is configured to store one or more iSCSI communication parameters in an extendable data structure 216. Preferably, the extendable data structure 216 is configured to store a set of basic parameter settings in a basic data structure 218 and a set of extended parameter settings in an extended data structure 220. In one embodiment, the extendable data structure 216 comprises a basic data structure 218 with about 420 bytes. Each byte is typically defined and may contain a different iSCSI parameter. In one embodiment, the basic data structure 218 stores common iSCSI parameters such as parameters for CHAP, IPSec, and SRP security protocols. Common iSCSI parameters may include a logical unit number ("LUN") of a target device, an IP address, a target ID, an encryption key, a password, etc.

In another embodiment, the basic data structure 218 holds iSCSI communication parameters for more than one iSCSI target 106. In yet another embodiment, the basic data structure 218 contains iSCSI parameters for two iSCSI targets 106 and a parameter to signal an iSCSI initiator 214 to attempt to establish a secure communication with a secondary target 106 if a primary target 106 is unavailable or if a secure communication cannot be established. One of skill in the art will recognize other parameters and configurations of a basic data structure 218 containing sensitive iSCSI communication parameters.

In one embodiment, the basic data structure 218 includes a flag for signaling that the extendable structure 216 is extended. The extended structure 220 may contain additional data beyond those defined in the basic structure 218. An iSCSI hardware manufacturer may use the extended data structure 220 to pass other parameters specific to a particular manufacturer's needs. For example, manufacturer's digital certificates may be stored in an extended data structure 220 along with a flag that signals the BMC 202 to reallocate the non-volatile memory 204 in the diskless computing device 108 to accommodate storage of a digital certificate. In another embodiment, an extended data structure 220 may contain flags and/or parameters to enable proprietary functionality for the iSCSI hardware. One of skill in the art will recognize other appropriate data suitable for transmission in an extended data structure 220 and in addition to data in a basic data structure 218 with iSCSI parameters.

The deployment wizard 122 also includes a link module 208 configured to establish a secure link to a diskless computing device 108 over the physically secure connection 120. In one embodiment, the link module 208 may establish a secure link by transmitting data over a physically secure connection 120. In another embodiment, the link module 208 may establish a secure link over a physically secure connection 120 using authentication and verification of security credentials. In yet another embodiment, the link module 208 may establish a secure link over a physically secure connection 120 by encrypting data. One of skill in the art will recognize other ways for the link module 208 to establish a secure link over a physically secure connection 120.

The deployment wizard 122 also includes a deployment module 210 configured to deploy the extendable data structure 216 with sensitive iSCSI communication parameters over the physically secure connection 120 to the non-volatile memory 204. Preferably, the deployment module 210 deploys the extendable data structure 216 once the link module 208 has established a secure link to the diskless computing device 108. Typically, the deployment module 210 deploys the extendable data structure 216 to the BMC 202 and the BMC 202 stores sensitive iSCSI communication parameters from the extendable data structure 216 in the non-volatile memory 204. In one embodiment, the BMC 202 stores the extendable data structure 216 in the non-volatile memory 204.

The non-volatile memory 204 is configured to provide the sensitive iSCSI communication parameters provided by the extendable data structure 216 to a BIOS of a CPU 212 of the diskless computing device 108 during a boot sequence. In one embodiment, the BMC 202 retrieves sensitive iSCSI parameters from the non-volatile memory 204 and transmits the sensitive iSCSI parameters when requested by the BIOS (CPU) 212. In another embodiment, the BIOS (CPU) 212 retrieves the sensitive iSCSI parameters directly from the non-volatile memory 204.

The diskless computing device 108 includes an iSCSI initiator 214 configured to communicate with an iSCSI target 106 over the SAN 104. The iSCSI target 106 may be a data storage device 106 with an image of the operating system, other general purpose data storage device 106, or other suitable iSCSI device. A boot sequence of the BIOS 212 transmits the sensitive iSCSI communication parameters to the iSCSI initiator 214 so that the iSCSI initiator 214 can establish secure communication with the data storage device 106 containing an image of the operating system. Once iSCSI initiator 214 establishes secure communication with the data storage device 106 (not shown), the BIOS 212 can load the operating system to the RAM of the diskless computing device 108 to complete the startup of the operating system on the diskless computing device 108. This process is referred to herein as a boot sequence.

Similarly, the iSCSI initiator 214 may use iSCSI communication parameters stored in the non-volatile memory 204 to establish communication with another data storage device 106 or other iSCSI target. Where security is not critical, once a link is established with the data storage device 106 containing the operating system, the iSCSI initiator 214 may access other iSCSI parameters from the data storage device 106 storing the operating system for establishing communication links to other iSCSI devices. One of skill in the art will recognize other applications where iSCSI parameters may be stored on a data storage device 106, may be passed over a physically secure connection 120 using the deployment module 210 to the non-volatile memory 204 for more secure communications, or a combination thereof.

In one embodiment, the deployment wizard 122 deploys the extendable data structure 216 with sensitive iSCSI communication parameters independent of operation of the operating system. Preferably, the deployment wizard 122 deploys the extendable data structure 216 prior to a boot sequence in which the operating system is loaded. In another embodiment, the deployment wizard 122 deploys the extendable data structure 216 while the operating system is running, but independent of operation of the operating system. In yet another embodiment, the deployment wizard 122 deploys the extendable data structure 216 without any processing by the CPU 212 or BIOS 212 execution.

Figure 3:
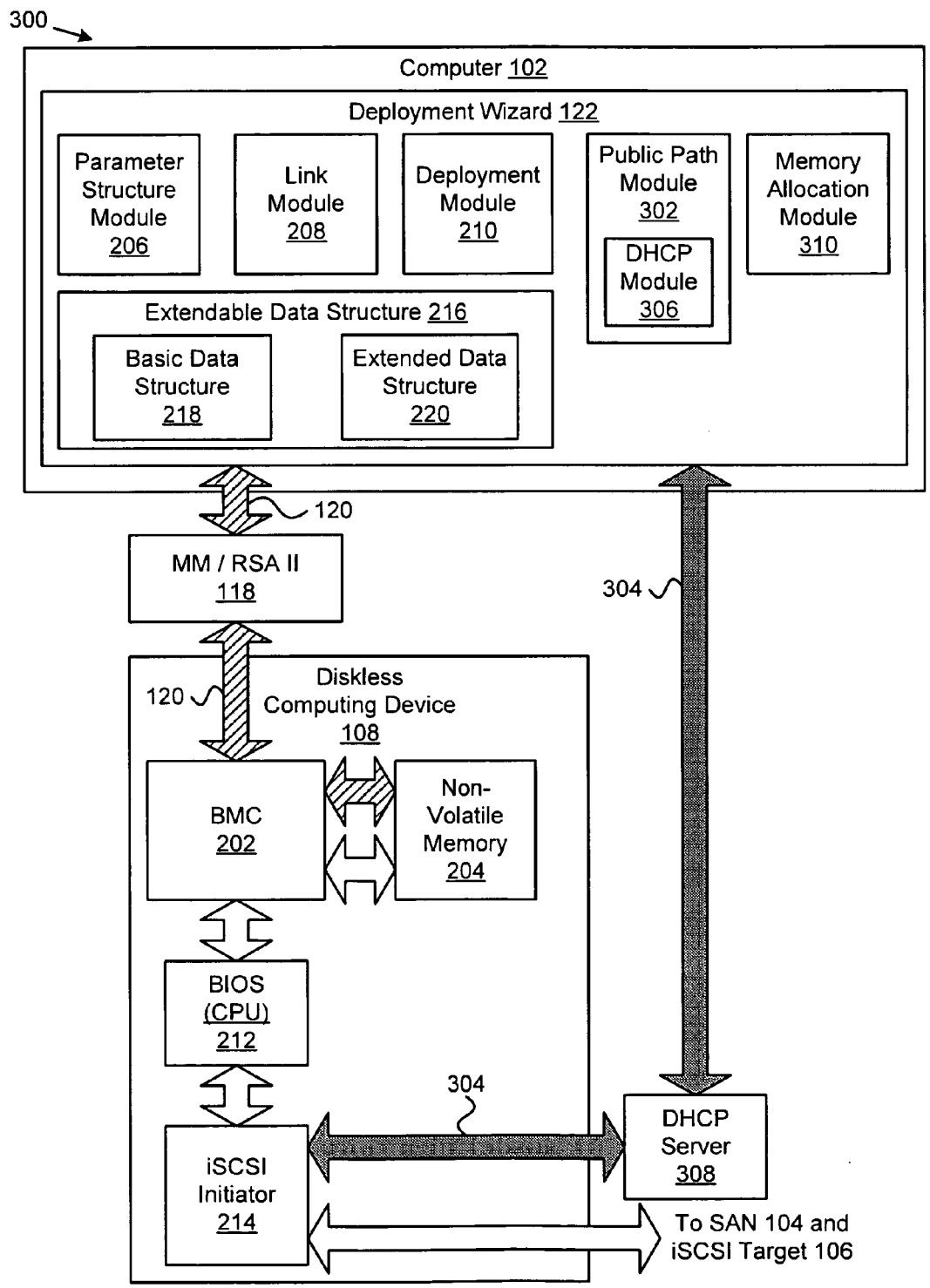
FIG. 3 is a schematic block diagram illustrating an embodiment of an apparatus for deploying sensitive and non-sensitive iSCSI communication parameters to a diskless computing device in accordance with the present invention.

FIG. 3 is a schematic block diagram illustrating an embodiment of an apparatus 300 for deploying sensitive and non-sensitive iSCSI communication parameters to a diskless computing device 108 in accordance with the present invention. The apparatus 300 includes a computer 102 with a deployment wizard 122 in communication over a secure connection 120 with a diskless computing device 108 through an MM/RSA II 118 and an extendable data structure 216 with a basic data structure 218 and an extended data structure 220 substantially as described in relation to FIG. 2. In addition, the diskless computing device 108 includes a BMC 202, a non-volatile memory 204, a BIOS (CPU) 212, an iSCSI initiator 214 and the deployment wizard 122 includes a parameter structure module 206, a link module 208, and a deployment module 210, also substantially similar to like numbered modules described in relation to FIG. 2.

In the present embodiment, the deployment wizard 122 includes a public path module 302 that transmits one or more non-sensitive iSCSI communication parameters through a non-secure connection 304 to the diskless computing device 108. The one or more non-sensitive iSCSI communication parameters may be stored with an extendable data structure 216. The non-secure connection 304 may include an in-band connection such as the SAN 104, or computer network 110, Internet or the like.

In one embodiment, the public path module 302 includes a DHCP module 306 configured to transmit the extendable data structure 216 having non-sensitive iSCSI communication parameters to a Dynamic Host Configuration Protocol ("DHCP") server 308 configured to send the extendable data structure 216 to the diskless computing device 108. In another embodiment, the DHCP server 308 transmits the extendable data structure 216 with non-sensitive iSCSI communication parameters to the iSCSI initiator 214.

In one embodiment, the DHCP module 306 transmits the extendable data structure at one time and then the DHCP server 308 transmits the extendable data structure 216 to the iSCSI initiator 214 during an initialization sequence. In another embodiment, the DHCP server 308 transmits the extendable data structure 216 to the iSCSI initiator 214 during a boot sequence of the BIOS 212. In yet another embodiment, the public path module 302 transmits the extendable data structure 216 to the iSCSI initiator 214 from the computer 102 without transmitting to the DHCP server 308. One of skill in the art will recognize other ways to send non-sensitive iSCSI parameters in an extendable data structure 216 to the diskless computing device 108.

Sensitive iSCSI communication parameters are iSCSI parameters considered by a user to be sensitive. Whether any given parameter is considered to be sensitive depends on the application and security concerns of the user. Any iSCSI parameter may be considered sensitive or non-sensitive. For example, a government entity like the Central Intelligence Agency ("CIA") may consider all iSCSI communications parameters used in any of its operations sensitive and may wish to send all such parameters to the non-volatile memory 204 via a physically secure connection 120. In another example, a store owner may consider some data transactions non-sensitive and may send iSCSI communications parameters used to establish a communication link with an iSCSI capable data storage device 106 over a non-secure path 304, or may store the parameters on the data storage device 106 with an image of the operating system. In one embodiment, the BIOS 212 notes a null value in a field in the extendable data structure 216 with sensitive iSCSI communication parameters stored on the non-volatile memory 202 and creates a "dummy" block to signal the iSCSI initiator 214 that certain iSCSI communication parameters are to be received from a DHCP server 308.

In one embodiment, the deployment wizard 122 includes a memory allocation module 310 configured to deploy an extended version of the extendable data structure 216 having a parameter setting to reallocate the non-volatile memory. In another embodiment, the memory allocation module 310 also transmits a digital certificate configured for storage within the reallocated non-volatile memory 204. For example, a digital certificate may be large in comparison with a basic data structure 218 (typically 420 bytes), so when a communication using digital signatures is to be used, the memory allocation module 310 transmits a flag to reallocate the non-volatile memory 204 to accommodate the digital certificate. In yet another embodiment, the memory allocation module 302 transmits multiple digital certificates along with a flag to reallocate the non-volatile memory 204 to accommodate the multiple digital certificates.

In one embodiment, the extendable data structure 216 that includes a small basic data structure 218 and an extended data structure 216 is advantageous for deployment of both sensitive and non-sensitive iSCSI parameters because the extendable data structure 216 creates a uniform architecture that can be used industry wide. In such a data structure, common iSCSI parameters are assigned locations in the basic data structure 218. Other custom or specialized iSCSI parameters can be stored in a customizable extended data structure 220. Different vendors may customize the extended data structure 216 to suit their needs.

In one embodiment, the DHCP module 306 deploys iSCSI communication parameters to the DHCP server 308 and the iSCSI initiator 214 receives the parameters. In this embodiment, the deployment wizard 122 does not deploy iSCSI parameters through the physically secure connection 120. In this embodiment, the user may not consider the deployed iSCSI parameters to be sensitive. The deployment wizard 120 may deploy the iSCSI parameters using the extendable data structure 216. One of skill in the art will recognize other configurations to deploy iSCSI parameters over the physically secure connection 120, over a non-secure connection 304, or a combination to achieve a deployment of iSCSI parameters to meet the needs of a user.

Figure 4:
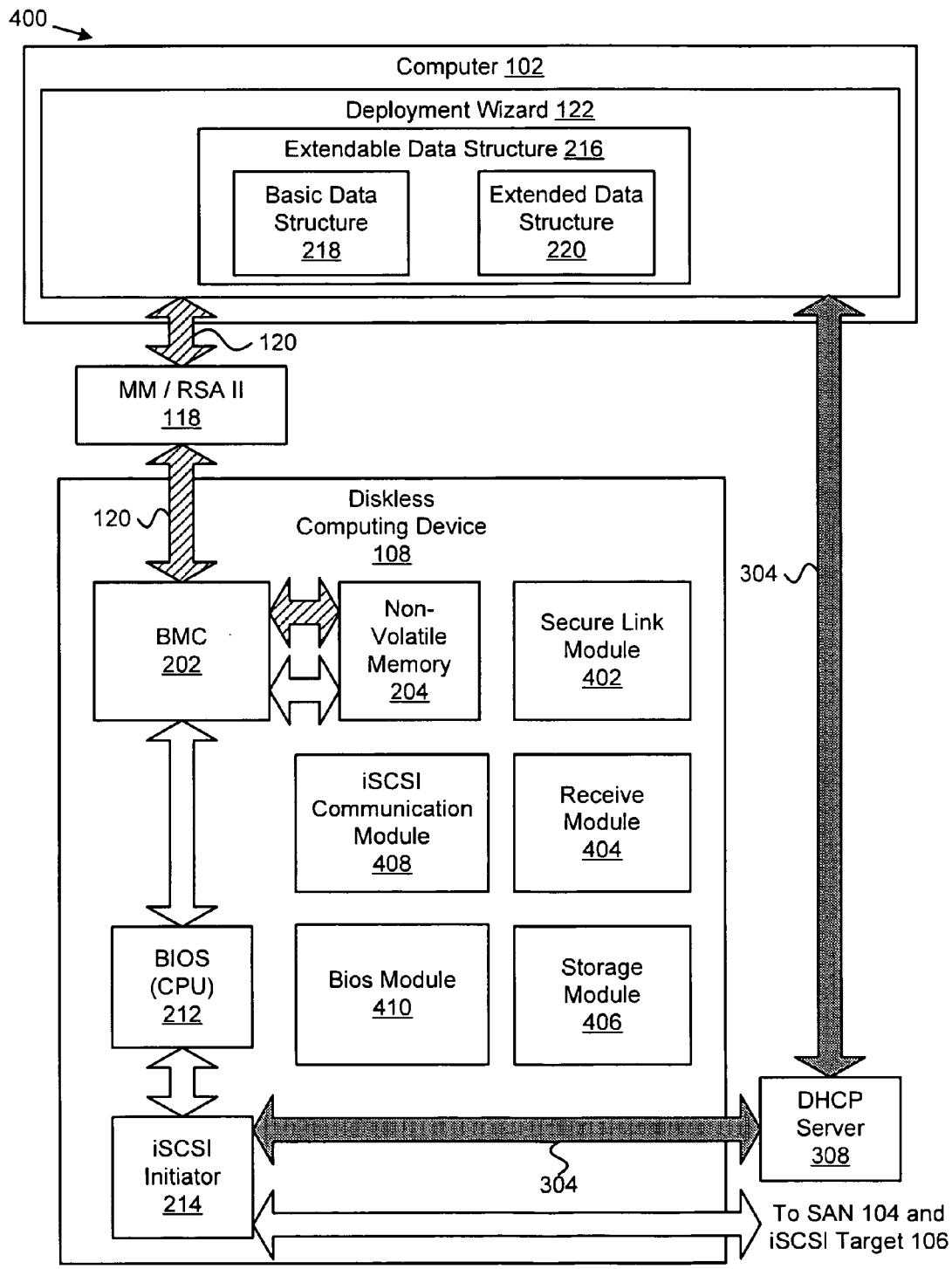
FIG. 4 is a schematic block diagram illustrating an alternate embodiment of an apparatus for deploying sensitive and non-sensitive iSCSI communication parameters to a diskless computing device in accordance with the present invention.

FIG. 4 is a schematic block diagram illustrating an alternate embodiment of an apparatus 400 for deploying sensitive and non-sensitive iSCSI communication parameters to a diskless computing device 108 in accordance with the present invention. The apparatus 400 includes a computer 102 with a deployment wizard 122 in communication over a physically secure connection 120 with a diskless computing device 108 through an MM/RSA II 118 and an extendable data structure 216 with a basic data structure 218 and an extended data structure 220 substantially as described in relation to FIG. 2. In addition, the diskless computing device 108 includes a BMC 202, a non-volatile memory 204, a BIOS (CPU) 212, an iSCSI initiator 214, a DHCP server 308, and a non-secure path 304; also substantially similar to like numbered modules described in relation to FIG. 2.

The apparatus 400 includes a secure link module 402, a receive module 404, a storage module 406, an iSCSI communication module 408, and a bios module 410. The secure link module 402 is configured to establish a secure link between the diskless computing device 108 and the computer 102 over a physically secure connection 120. Typically, the secure link module 402 establishes a link to the BMC 202 through the physically secure connection 120.

The receive module 404 is configured to receive one or more sensitive iSCSI communication parameters in an extendable data structure 216. The extendable data structure 216 typically comprises a set of basic sensitive iSCSI communication parameter settings in a basic data structure 218 and may include a set of extended sensitive iSCSI communication parameter settings in an extended data structure 220.

The storage module 406 is configured to store the one or more sensitive iSCSI communication parameters in the non-volatile memory 204. The non-volatile memory 204 is substantially similar to the non-volatile memory 204 described above in relation to FIG. 2. Typically, the storage module 406 is associated with the BMC 202.

In one embodiment, the apparatus 400 includes an iSCSI communication module 408 configured to receive the sensitive iSCSI communication parameters from the CPU 212 to establish a secure iSCSI communication session between the diskless computing device 108 and an iSCSI target device 106. Typically, an iSCSI initiator 214 receives the sensitive iSCSI communication parameters from the CPU 212. The iSCSI initiator 214 then establishes a secure communication with an iSCSI target 106 such as a data storage device 106 containing an image of an operating system or a general purpose data storage device 106.

In one embodiment, the apparatus 400 includes a bios module 410 configured to retrieve one or more sensitive iSCSI communication parameters from the non-volatile memory 204 during a boot sequence. In another embodiment, an iSCSI communication parameter is retrieved after the operating system is running. In one embodiment, the BMC 202 retrieves sensitive iSCSI communication parameters from the non-volatile memory 204 and the bios module 410 retrieves the sensitive iSCSI communication parameters from the BMC 202. In another embodiment, the bios module 410 retrieves the sensitive iSCSI communication parameters directly from the non-volatile memory 204.

In another embodiment, the iSCSI communication module 408 receives non-sensitive iSCSI communications parameters transmitted from the DHCP server 308 in addition to the sensitive iSCSI communication parameters retrieved from the non-volatile memory 204. The iSCSI initiator 214 then uses sensitive and non-sensitive iSCSI communication parameters to establish a secure communication with an iSCSI target 106. A secure iSCSI communication between the iSCSI initiator 214 and an iSCSI target 106 may comprise a communication protocol such as CHAP, SRP, IPSec, digital certificates, or other suitable security protocol to prevent unwanted access or monitoring by a third party. The iSCSI initiator 214 may be a software initiator or a hardware initiator.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
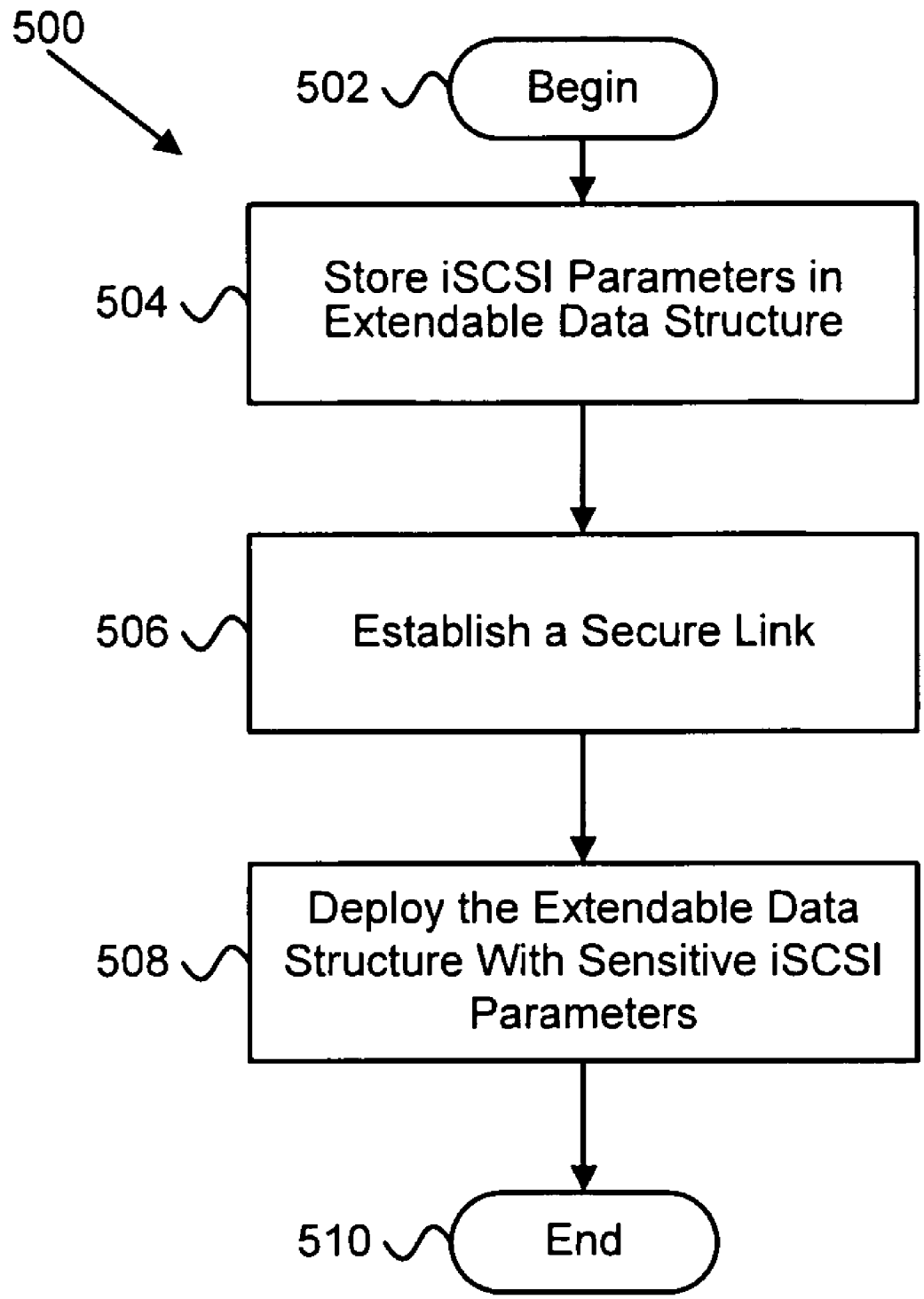
FIG. 5 is a schematic flow chart diagram illustrating one embodiment of a method for deploying sensitive iSCSI communication parameters to a diskless computing device in accordance with the present invention.

FIG. 5 is a schematic flow chart diagram illustrating one embodiment of a method 500 for deploying sensitive iSCSI communication parameters to a diskless computing device 108 in accordance with the present invention. The method 500 begins 502 and the parameter structure module 206 in the deployment wizard 122 stores 504 one or more iSCSI communication parameters in an extendable data structure 216. The extendable data structure 216 includes sensitive iSCSI communication parameters in a basic data structure 218 and may include custom iSCSI communication parameters in an extended data structure 220.

The link module 208 establishes 506 a secure link to the diskless computing device 108 over a physically secure connection 120 and the deployment module 210 then deploys 508 the extendable data structure 216 containing the sensitive iSCSI communication parameters to the non-volatile memory 204 and the method 500 ends 510.

Figure 6:
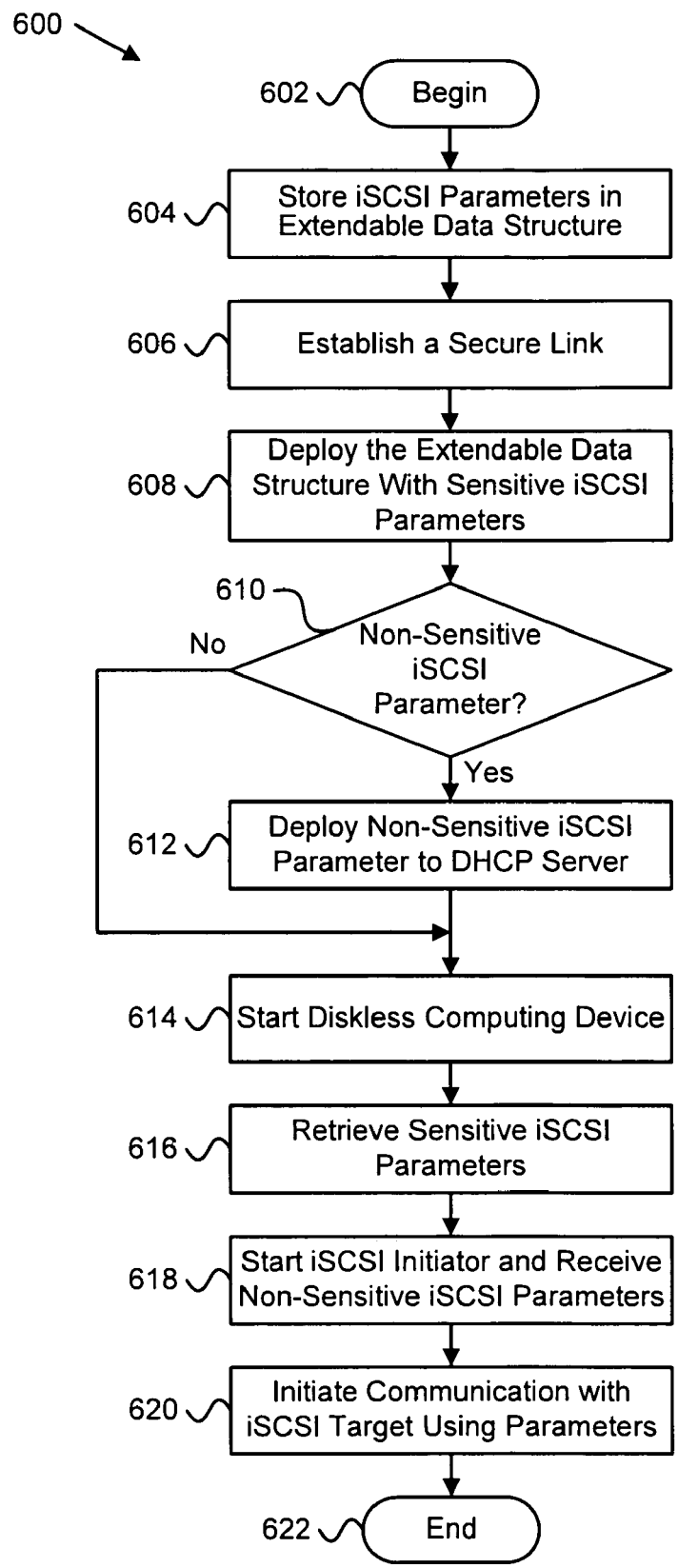
FIG. 6 is a schematic flow chart diagram illustrating an embodiment of a method for deploying sensitive and non-sensitive iSCSI communication parameters to a diskless computing device in accordance with the present invention.

FIG. 6 is a schematic flow chart diagram illustrating an embodiment of a method 600 for deploying sensitive and non-sensitive iSCSI communication parameters to a diskless computing device 108 in accordance with the present invention. The method 600 begins 602 and the parameter structure module 206 in the deployment wizard 122 stores 604 one or more iSCSI communication parameters in an extendable data structure 216. The link module 208 establishes 606 a secure link to the diskless computing device 108 over a physically secure connection 120 and the deployment module 210 then deploys 608 the extendable data structure 216 containing the sensitive iSCSI communication parameters to the non-volatile memory 204.

The public path module 302 then determines 610 if there are non-sensitive iSCSI communication parameters to be deployed. If the public path module 302 determines 610 there are non-sensitive parameters to deploy, the DCHP module 306 deploys 612 the non-sensitive iSCSI communication parameters to the DHCP server 308. The BIOS (CPU) 212 then starts 614 a boot sequence in the diskless computing device 108. If the public path module 302 determines 610 there are no non-sensitive parameters to deploy the DHCP module 306 does not deploy any parameters and the BIOS (CPU) 212 then starts a boot sequence. The bios module 410 then retrieves 616 sensitive iSCSI communication parameters from the non-volatile memory 204. The BIOS (CPU) 212 then starts 618 the iSCSI initiator 214. If there are non-sensitive iSCSI parameters, the iSCSI communication module 408 receives 618 the non-secure iSCSI communication parameters transmitted from the DHCP server 308. The iSCSI communication module 408 initiates 620 a secure communication between the iSCSI initiator 214 and an iSCSI target 106 such as a data storage device 106 using the iSCSI communication parameters and the method 600 ends 622.

Figure 7:
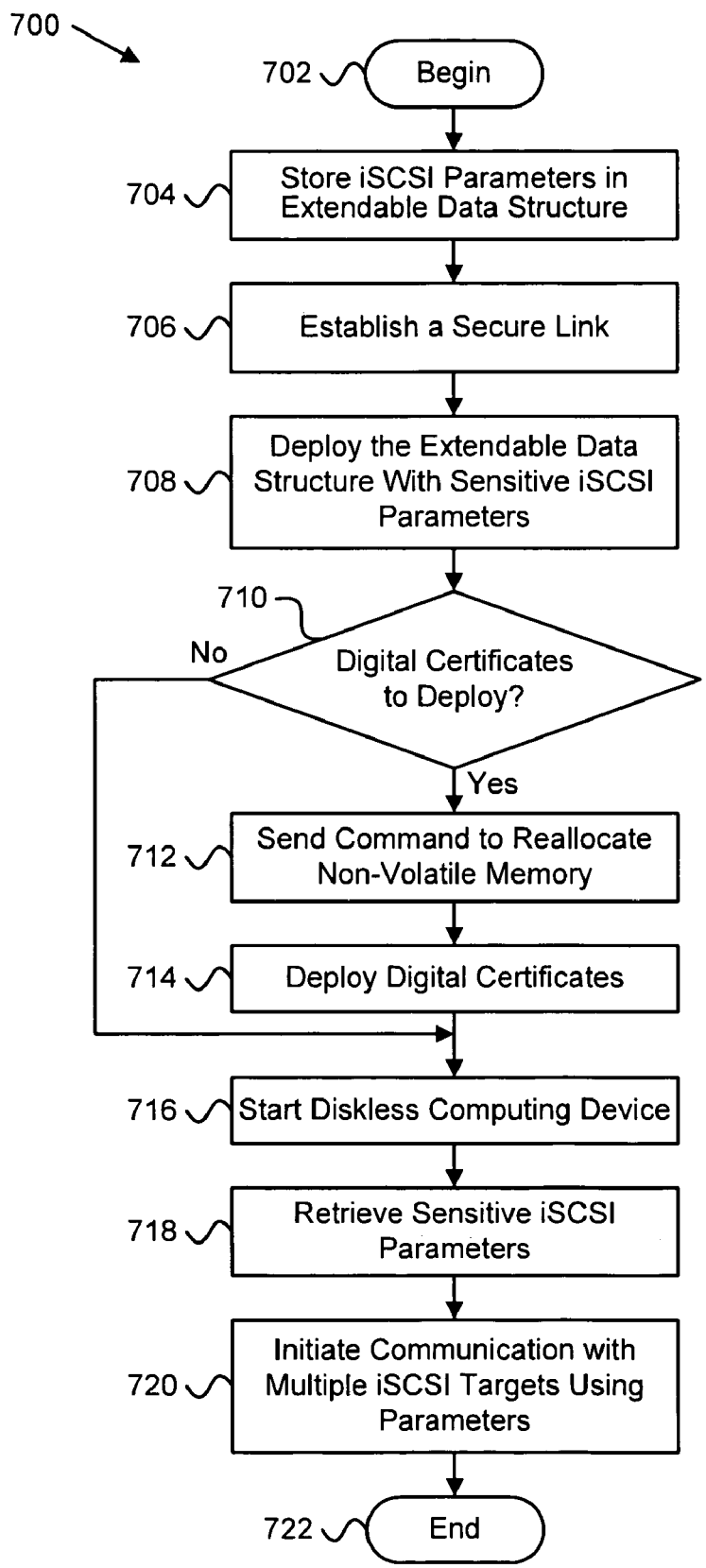
FIG. 7 is a schematic flow chart diagram illustrating a one embodiment of a method for deploying sensitive iSCSI communication parameters to reallocate non-volatile memory in a diskless computing device and to transmit digital certificates in accordance with the present invention.

FIG. 7 is a schematic flow chart diagram illustrating a particular embodiment of a method 700 for deploying sensitive iSCSI communication parameters to reallocate non-volatile memory 204 in the diskless computing device 108 and for transmitting digital certificates in accordance with the present invention. The method 700 begins 702 and the parameter structure module 206 in the deployment wizard 122 stores 704 one or more iSCSI communication parameters in an extendable data structure 216. The link module 208 establishes 706 a secure link to the diskless computing device 108 over a physically secure connection 120. The deployment module 210 then deploys 708 the extendable data structure 216 containing the sensitive iSCSI communication parameters to the non-volatile memory 204.

The memory allocation module 310 then determines 710 if there are digital certificates to deploy. If the memory allocation module 310 determines 710 there are digital certificates to deploy, the memory allocation module 310 sends 712 a command to reallocate the non-volatile memory 204 and deploys 714 the digital certificates to be stored in the non-volatile memory 204. The BIOS (CPU) 212 then starts 716 a boot sequence in the diskless computing device 108. If the memory allocation module 310 determines 710 there are no digital certificates to deploy, the memory allocation module 310 does not send 712 a command to reallocate the non-volatile memory 204 and the BIOS (CPU) 212 then starts 716 a boot sequence in the diskless computing device 108. The bios module 410 then retrieves 718 sensitive iSCSI communication parameters from the non-volatile memory 204. The CPU 212 then starts 720 the iSCSI initiator 214. The iSCSI communication module 408 initiates 720 a secure communication between the iSCSI initiator 214 and an iSCSI target 106 such as a data storage device 106 using the iSCSI communication parameters, including digital certificates if any, and the method 700 ends 722.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to deploy sensitive communication parameters to a diskless computing device, the apparatus comprising:

a parameter structure module configured to store one or more Internet Small Computer System Interface ("iSCSI") communication parameters in an extendable data structure configured to store a set of basic parameter settings and a set of extended parameter settings;

a link module configured to establish a secure link between a computer and a diskless computing device over a physically secure connection comprising an out-of-band connection, wherein the computer and the diskless computing device are further connected with an additional connection comprising an in-band connection; and a deployment module configured to deploy the extendable data structure over the secure connection to a non-volatile memory in the diskless computing device, wherein the non-volatile memory is configured to provide sensitive iSCSI communication parameters provided by the extendable data structure to a CPU of the diskless computing device during a boot sequence, wherein all or a portion of the parameter structure module, the link module, and the deployment module comprise one or more of logic hardware and executable code, the executable code stored on one or more computer readable storage media.

2. The apparatus of claim 1, wherein the deployment module is configured to deploy the extendable data structure independent of operation of an operating system of the diskless computing device.

3. The apparatus of claim 1, further comprising a public path module configured to transmit an extendable data structure with one or more non-sensitive iSCSI communication parameters through a non-secure connection to the diskless computing device.

4. The apparatus of claim 3, wherein the public path module further comprises a DHCP module configured to transmit the extendable data structure having non-sensitive iSCSI communication parameters to a Dynamic Host Configuration Protocol ("DHCP") server configured to send the extendable data structure to the diskless computing device.

5. The apparatus of claim 3, wherein the public path module is configured to transmit the extendable data structure having non-sensitive iSCSI communication parameters to the diskless computing device during an initialization sequence.

6. The apparatus of claim 1, wherein the secure connection comprises a monitor module configured to also communicate environmental factors with a plurality of diskless computing devices.

7. The apparatus of claim 1, wherein the secure connection comprises a Remote Supervisor Adaptor ("RSA II") configured to also communicate environmental data with a plurality of diskless computing devices.

8. The apparatus of claim 1, further comprising a memory allocation module configured to deploy an extended version of the extendable data structure having a parameter setting to reallocate the non-volatile memory.

9. The apparatus of claim 8, wherein the memory allocation module is further configured to transmit a digital certificate configured for storage within the reallocated non-volatile memory.

10. An apparatus to deploy sensitive communication parameters to a diskless computing device, the apparatus comprising:

a secure link module configured to establish a secure link between a diskless computing device and a computer over a physically secure connection comprising an out-of-band connection, wherein the computer and the diskless computing device are further connected with an additional connection comprising an in-band connection;

a receive module configured to receive one or more sensitive Internet Small Computer System Interface ("iSCSI") communication parameters in an extendable data structure comprising a set of basic parameter settings and a set of extended parameter settings; and a storage module configured to store the one or more sensitive iSCSI communication parameters in a non-volatile memory in the diskless computing device, wherein the non-volatile memory is configured to provide the one or more sensitive iSCSI communication parameters provided by the extendable data structure to a CPU in the diskless computing device during a boot sequence, wherein all or a portion of the secure link module, the receive module, and the storage module comprise one or more of logic hardware and executable code, the executable code stored on one or more computer readable storage media.

11. The apparatus of claim 10, further comprising an iSCSI communication module configured to receive the sensitive iSCSI communication parameters from the CPU to establish a secure iSCSI communication session between the diskless computing device and an iSCSI target.

12. The apparatus of claim 11, wherein the iSCSI communication module is further configured to receive non-sensitive iSCSI communications parameters transmitted from a DHCP server.

13. The apparatus of claim 11, wherein the iSCSI target device is a data storage device having an operating system for the diskless computing device.

14. The apparatus of claim 10, further comprising a bios module configured to retrieve the one or more iSCSI communication parameters from the non-volatile memory during a boot sequence.

15. A system to deploy sensitive communication parameters to a diskless computing device, the system comprising:

a computer;

a diskless computing device;

an Internet Small Computer System Interface ("iSCSI") target device;

a storage area network connecting the diskless computing device and the iSCSI target device, wherein the storage area network at least partially communicates using iSCSI;

a parameter structure module configured to store one or more iSCSI communication parameters in an extendable data structure configured to store a set of basic parameter settings and a set of extended parameter settings;

a link module configured to establish a secure link between the computer and the diskless computing device over a physically secure connection comprising an out-of-band connection, wherein the computer and the diskless computing device are further connected with an additional connection comprising an in-band network connection;

a deployment module configured to deploy the extendable data structure from the computer to the diskless computing device over the secure connection; and a storage module configured to store the one or more sensitive iSCSI communication parameters of the extendable data structure in a non-volatile memory in the diskless computing device, wherein the non-volatile memory is configured to provide the sensitive iSCSI communication parameters provided by the extendable data structure to a CPU in the diskless computing device during a boot sequence.

16. The system of claim 15, further comprising an iSCSI communication module configured to receive the sensitive iSCSI communication parameters to establish a secure iSCSI communication session between the diskless computing device and an iSCSI target device.

17. The system of claim 16, wherein the iSCSI communication module is further configured to receive non-sensitive iSCSI communications parameters transmitted from a DHCP server.

18. The system of claim 15, further comprising a public path module configured to transmit an extendable data structure with one or more iSCSI communication parameters through a non-secure connection to the diskless computing device.

19. The system of claim 15, further comprising a baseboard management controller ("BMC") in the diskless computing device configured to receive the extendable data structure and store the one or more sensitive iSCSI communication parameters of the extendable data structure in the non-volatile memory.

20. The system of claim 15, wherein the communication parameters of the extendable data structure comprise parameters compatible with secure communication using one of a Challenge Handshake Authentication Protocol ("CHAP"), a Secure Remote Password ("SRP") protocol, and an Internet Protocol Security ("IPSec") protocol.

21. The system of claim 15, wherein the diskless computing device is a blade server in a blade center.

22. The system of claim 15, wherein the iSCSI target comprises a general purpose data storage device.

23. A non-transitory computer readable storage medium tangibly embodying a program of machine-readable instructions executable by a digital processing apparatus to perform an operation to deploy sensitive communication parameters to a diskless computing device, the operation comprising:
   storing one or more Internet Small Computer System Interface ("iSCSI") communication parameters in a data structure;
   establishing a secure link between a computer and a diskless computing device over a physically secure connection comprising an out-of-band connection, wherein the computer and the diskless computing device are further connected with an additional connection comprising an in-band connection; and
   deploying the data structure over the secure connection to a non-volatile memory in the diskless computing device, wherein the non-volatile memory is configured to provide sensitive iSCSI communication parameters provided by the data structure to a CPU of the diskless computing device during a boot sequence.

24. The non-transitory computer readable storage medium of claim 23, wherein deploying the data structure is independent of operation of an operating system of the diskless computing device.

25. The non-transitory computer readable storage medium of claim 23, wherein the instructions further comprise an operation to transmit a data structure with one or more non-sensitive iSCSI communication parameters through a non-secure connection to the diskless computing device.

26. The non-transitory computer readable storage medium of claim 25, further comprising an operation to transmit the data structure having non-sensitive iSCSI communication parameters to a DHCP server configured to send the data structure to one or more diskless computing device.

27. The non-transitory computer readable storage medium of claim 25, further comprising an operation to transmit the data structure having non-sensitive iSCSI communication parameters to the diskless computing device during an initialization sequence.

28. The non-transitory computer readable storage medium of claim 23, further comprising an operation to receive the iSCSI communication parameters from the CPU to establish a secure iSCSI communication between the diskless computing device and an iSCSI target.

29. The non-transitory computer readable storage medium of claim 28, further comprising an operation to receive non-sensitive iSCSI communications parameters transmitted from a DHCP server.

30. The non-transitory computer readable storage medium of claim 23, wherein the iSCSI communication parameters of the data structure comprise parameters compatible with secure communication using one of a Challenge Handshake Authentication Protocol ("CHAP"), a Secure Remote Password ("SRP") protocol, and an Internet Protocol Security ("IPSec") protocol.

31. The non-transitory computer readable storage medium of claim 23, wherein the instructions further comprise an operation to deploy an extended version of the data structure having a parameter setting to reallocate the non-volatile memory to store a digital certificate.

32. The non-transitory computer readable storage medium of claim 23, wherein the instructions further comprise an operation to retrieve the one or more iSCSI communication parameters from the non-volatile memory during a boot sequence.

33. The non-transitory computer readable storage medium of claim 23, further comprising an operation to establish the secure connection through authentication and verification of security credentials.

34. A method for configuring an Internet Small Computer System Interface ("iSCSI") network of a diskless computing device, the method comprising:
   determining an iSCSI parameter security profile of a customer having a plurality of diskless computing devices;
   defining an extendable data structure configured to store a set of basic parameter settings and a set of extended parameter settings that satisfies the iSCSI parameter security profile; and
   executing configuration software configured to:
      store one or more iSCSI communication parameters in the extendable data structure;
      establish a link to each diskless computing device being configured in a network over a physically secure connection; and
      deploy the extendable data structure over the secure connection to a non-volatile memory in each diskless computing device being configured, wherein the non-volatile memory is configured to provide sensitive iSCSI communication parameters provided by the extendable data structure to a CPU of the diskless computing device during a boot sequence.

35. The method of claim 34, further comprising testing the boot sequence for each diskless computing device to ensure conformity with the iSCSI parameter security profile.

* * * * *

UNITED STATES PATENT AND TRADEMARK OFFICE
Certificate

Patent No. 7,882,562 B2                                                            Patented: February 1, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jesse Paul Arroyo, Rochester, MN (US); Joseph Edward Bolan, Morrissville, NC (US);Thomas M. Brey, Cary, NC (US); Josep Cors, Rochester, MN (US); Gregory William Dake, Durham, NC (US); Scott Neil Dunham, Raleigh, NC (US); William Gavin Holland, Cary, NC (US); Theodore Brian Vojnovich, Cary, NC (US) and Randall S. Nelson, Rochester, MN (US).

Signed and Sealed this Twenty-fourth Day of June 2014.

GILBERTO BARRON, JR.
*Supervisory Patent Examiner*
Art Unit 2432
Technology Center 2400